United States Patent
Lee et al.

(10) Patent No.: US 9,363,537 B2
(45) Date of Patent: Jun. 7, 2016

(54) METHOD FOR FOUR-PATH TREE STRUCTURED VECTOR QUANTIZATION

(71) Applicant: KOREA AEROSPACE RESEARCH INSTITUTE, Daejeon (KR)

(72) Inventors: Hyeon-Cheol Lee, Daejeon (KR); Eun Su Kang, Daegu (KR); Sang Soon Yong, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 156 days.

(21) Appl. No.: 14/294,511

(22) Filed: Jun. 3, 2014

(65) Prior Publication Data

US 2014/0355672 A1 Dec. 4, 2014

(30) Foreign Application Priority Data

Jun. 4, 2013 (KR) .................. 10-2013-0064114

(51) Int. Cl.
*H04N 19/126* (2014.01)
*H04N 19/94* (2014.01)

(52) U.S. Cl.
CPC .................... *H04N 19/94* (2014.11)

(58) Field of Classification Search
CPC ........................................ H04N 19/94
USPC .................................. 375/240.03
See application file for complete search history.

(56) References Cited

U.S. PATENT DOCUMENTS

| 5,649,030 A * | 7/1997 | Normile ............ G06T 9/008 348/417.1 |
| 5,960,120 A * | 9/1999 | Lee ................. G06T 9/008 375/E7.139 |
| 5,966,471 A * | 10/1999 | Fisher .............. G06T 9/008 382/253 |
| 6,141,446 A * | 10/2000 | Boliek .............. H03M 7/30 375/240.11 |
| 6,762,769 B2 * | 7/2004 | Guo ................. G06T 11/001 345/582 |
| 7,016,545 B1 * | 3/2006 | Schwartz ........... G06F 17/148 375/E7.016 |
| 2002/0106019 A1 * | 8/2002 | Chaddha ............ H04N 19/51 375/240.02 |
| 2010/0174539 A1 * | 7/2010 | Nandhimandalam . G06F 17/148 375/E7.016 |

* cited by examiner

*Primary Examiner* — Christopher S Kelley
*Assistant Examiner* — Deirdre Beasley
(74) *Attorney, Agent, or Firm* — Rabin & Berdo, P.C.

(57) ABSTRACT

Disclosed is a method for four-path tree structured vector quantization, comprising: (a) placing codebook vectors where magnitudes of vectors are arranged in order at lowermost nodes; (b) configuring upper nodes by averaging vector values of the lowermost adjacent four nodes; (c) calculating mean square errors to paths of the upper nodes (A, B, C, and D) corresponding to four paths from an input vector 'X'; (d) presetting a threshold between 0 and 1 after the '(c)'; (e) calculating thresholds between the input vector 'X' and four paths 'A', 'B', 'C', and 'D', based on the mean square errors; and (f) comparing the thresholds calculated in the '(d)' with the preset threshold to select a path having a threshold greater than the preset threshold, in which dynamic four-path tree structured vector quantization is used instead of conventional dynamic two-path tree structured vector quantization, thereby more efficiently and quickly searching a codebook.

2 Claims, 3 Drawing Sheets

METHOD FOR FOUR-PATH TREE STRUCTURED VECTOR QUANTIZATION

CROSS-REFERENCE TO RELATED APPLICATION

This application claims priority to and the benefit of Korean Patent Application No. 10-2013-0064114 filed in the Korean Intellectual Property Office on Jun. 4, 2013, the entire contents of which are incorporated herein by reference.

BACKGROUND OF THE INVENTION (a) Field of the Invention

The present invention relates to a method for four-path tree structured vector quantization, and more particularly to a method for four-path tree structured vector quantization, in which dynamic four-path tree structured vector quantization is used instead of conventional dynamic two-path tree structured vector quantization, thereby more efficiently and quickly searching a codebook.

(b) Description of the Related Art

In general, vector quantization has been widely used in transmitting and receiving video data. A transmitting terminal previously stores various pieces of data in a codebook and compares it with the video data, thereby sending a receiving terminal only an address that represents a group where the closest (i.e., the most similar) data is collected. The receiving terminal restores the video data with data of the codebook held in a receiving address, while holding the same codebook. For example, if a codebook vector has a length of 64 bytes, it is compared with video data of 64 bytes and only an address (the length of 1 byte) is sent to the receiving terminal, thereby having a compression ratio of 64:1.

When the transmitting terminal compares all data of the codebook with original data, it is called full search (FS). This method takes much time. In the foregoing example, if the number of codebook is 256, the transmitting terminal has to perform the comparison 256 times and search the codebook having the smallest mean square error (mse) in order to determine one codebook address, thereby transmitting the determined codebook address.

If the video data has a size of 1024×2048, the number of address to be transmitted is 32768(=1024×2048/64) and 256 comparisons (when the number of codebook is 256) have to be performed 32768 times.

To solve such shortcomings, there has been proposed a method of tree structured vector quantization. This method employs a tree-structure search when the data of the codebook is compared with video data.

In a tree-structure as shown in FIG. 1, codebook vectors where the magnitudes of vectors (i.e., the square roots of the sums of squared vector components) are arranged in order are placed at the lowermost nodes in the structure (in FIG. 1), and their upper nodes in the same tree-structure are configured by averaging the vectors of adjacent two nodes. In a vector quantization method for the tree-structure, the path having the smaller mean square error (mse) between the input vector and the uppermost tree structured vector is used to transmit the finally selected lowermost codebook vector address. In the vector quantization method for the tree-structure, the number of calculation time is determined in consideration of the number of branch to be compared. Therefore, the codebook vector can be selected by performing comparison 16 times with respect to 256 vectors, of which the number of calculation time is reduced by $\frac{1}{16}$ as compared with the conventional comparisons of 256 times. In FIG. 1, G has 120.92=sqrt $(85^2+86^2)$, and 211=$((100-85)^2+(100-86)^2)/2$. Further, the vector (89, 93) of C is ((85+94)/2, (86+100)/2).

However, the foregoing dynamic path tree structured vector quantization with two branches has a problem that since it is impossible to get out of an unsuitable path even though another path is more suitable, thereby resulting in increasing an error.

To overcome the foregoing problem, there has been proposed a dynamic path tree structured vector quantization, in which a threshold (thr) between 0 and 1 is set up through [Expression 1], and two paths are all taken into account when it is smaller than the threshold but otherwise only a path having a small mse is considered.

$$T=|mse(B1)-mse(B2)|/(mse(B1)+mse(B2)) \quad \text{[Expression 1]}$$

where, mse(B1) and mse(B2) are an mse of a branch 1 and an mse of a branch 2 from the node, respectively.

Referring to FIG. 2, if thr is set to 0.7 (T<thr), both two paths are considered, but otherwise only the path having the small mse is considered, thereby generating many paths finally.

In FIG. 2, two paths of A-D-I and B-E-K are generated. If the last nodes of two paths are compared with respect to the mse, 26 is smaller than 31 and therefore the path of A-D-I path is selected. The number of calculation time is 510(=256+128+64+32+16+8+4+2) when thr is 1, and 16 when thr is 0.

In addition, concept of block gain vector quantization is introduced. Thus, a picture is divided in accordance with blocks, and their average and standard deviation are calculated. Then, such data undergoes normalization (an average: 0, a standard deviation: 1). The average and standard deviation is separately transferred to the receiving terminal and compensated after the quantization.

However, the conventional two path tree-structured vector quantization has a problem of slowing down the calculation and comparison as picture quality of video data has become higher to high definition (HD) or full HD.

RELATED REFERENCE

Patent Document

1. Korean Patent No. 10-0613106 (Aug. 9, 2006)

SUMMARY OF THE INVENTION

Accordingly, the present invention is conceived to solve the forgoing problems, and an aspect of the present invention is to provide a method for four-path tree structured vector quantization, in which dynamic four-path tree structured vector quantization is used instead of conventional dynamic two-path tree structured vector quantization, thereby more efficiently and quickly searching a codebook.

In accordance with an aspect of the present invention, there is provided a method for four-path tree structured vector quantization, which previously stores various pieces of data in a codebook and compares the stored data with video data to send a receiving terminal only an address that represents a group where the most similar data is collected, the method comprising: (a) placing codebook vectors where magnitudes of vectors are arranged in order at lowermost nodes; (b) configuring upper nodes by averaging vector values of the lowermost adjacent four nodes; (c) calculating mean square errors to paths of the upper nodes (A, B, C, and D) corresponding to four paths from an input vector 'X'; (d) presetting a threshold between 0 and 1 after the '(c)'; (e) calculating thresholds between the input vector 'X' and four paths 'A', 'B', 'C', and 'D', based on the mean square errors; and (f) comparing the thresholds calculated in the '(d)' with the preset threshold to select a path having a threshold greater than the preset threshold.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Figure 1:
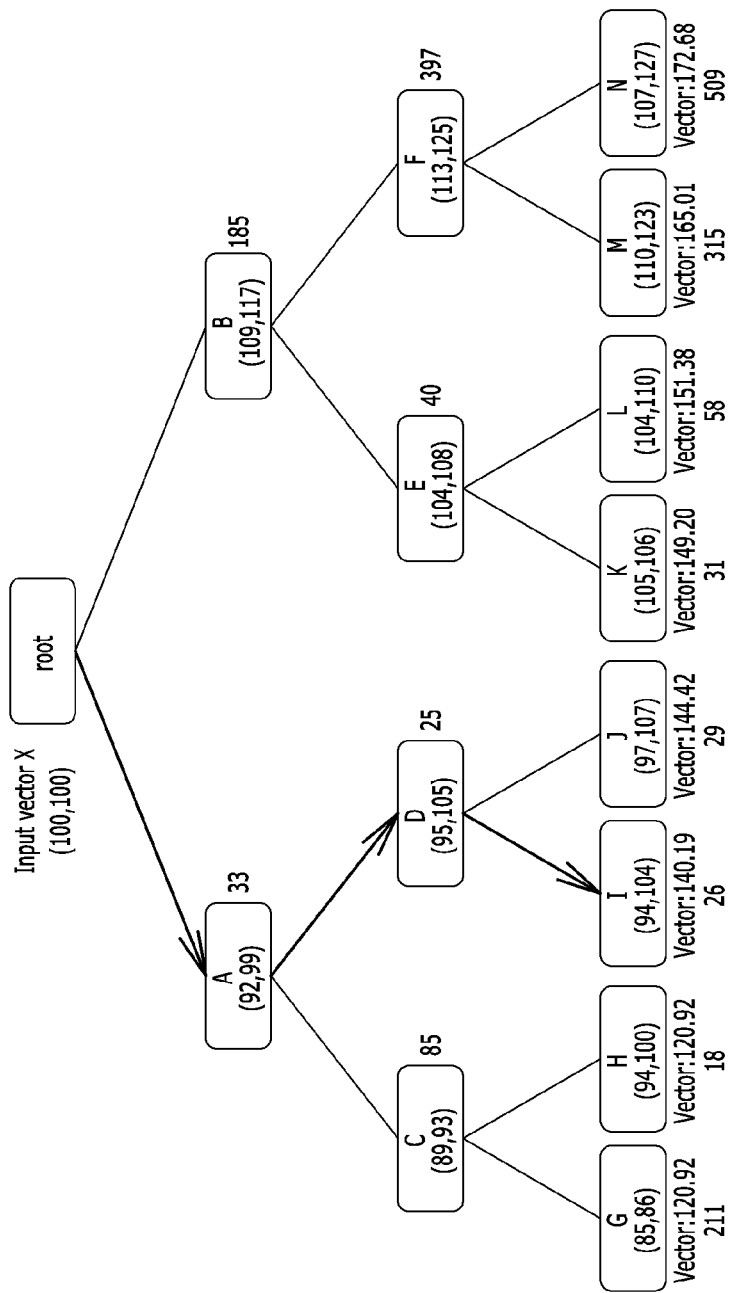
FIG. 1 is a view for explaining tree structured vector quantization using a tree structured pattern when codebook data is compared with video data.
Figure 2:
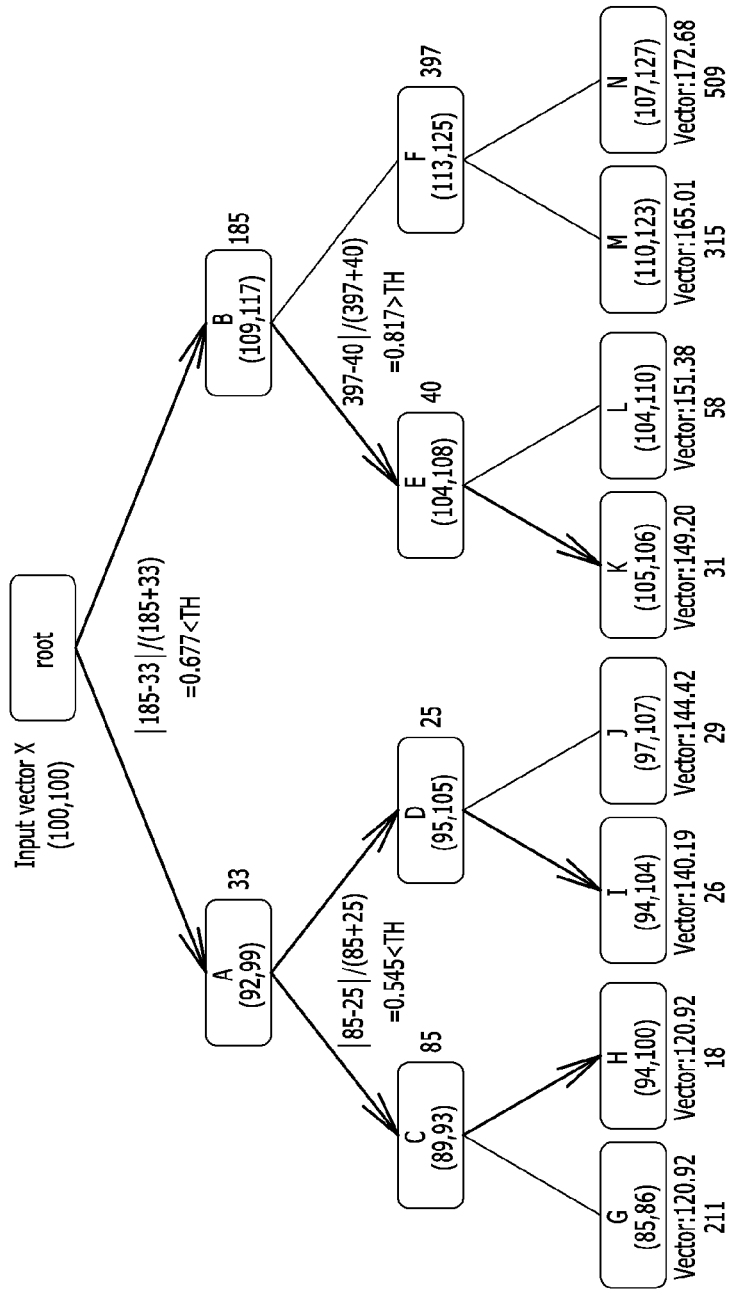
FIG. 2 is a view for explaining a method of dynamic path tree structured vector quantization using a tree structured pattern for comparing/calculating both two branches or only one branch in accordance with thresholds when codebook data is compared with video data.

Hereinafter, exemplary embodiments according to the present invention will be described with reference to accompanying drawings. Also, terms and words used in the following description and claims have to be interpreted by not the limited meaning of the typical or dictionary definition, but the meaning and concept corresponding to the technical idea of the present invention on the assumption that the inventor can properly define the concept of the terms in order to describe his/her own invention in the best way.

Accordingly, the disclosure in the specification and the configurations shown in the drawings are just preferred embodiments of the present invention and do not cover all the technical idea of the present invention. Thus, it should be appreciated that such embodiments may be replaced by various equivalents and modifications at a point of time when the present application is filed.

According to an embodiment of the present invention, a four-path tree structured vector quantization system a four-path tree structured vector quantization system includes a transmitting terminal and a receiving terminal.

The transmitting terminal previously stores various pieces of data in a codebook and compares it with video data, thereby sending the receiving terminal only an address that represents a group where the closest (the most similar) data is collected.

Meanwhile, the receiving terminal restores the video data with data of the codebook held in a receiving address, while holding the same codebook. For example, if a codebook vector has a length of 64 bytes, it is compared with video data of 64 bytes and only an address (the length of 1 byte) is sent to the receiving terminal, thereby having a compression ratio of 64:1.

The foregoing configuration, that is, a method for four-path tree structured vector quantization according to an embodiment of the present invention, based on the transmitting terminal and the receiving terminal, will be described in more detail with reference to FIG. 3.

Figure 3:
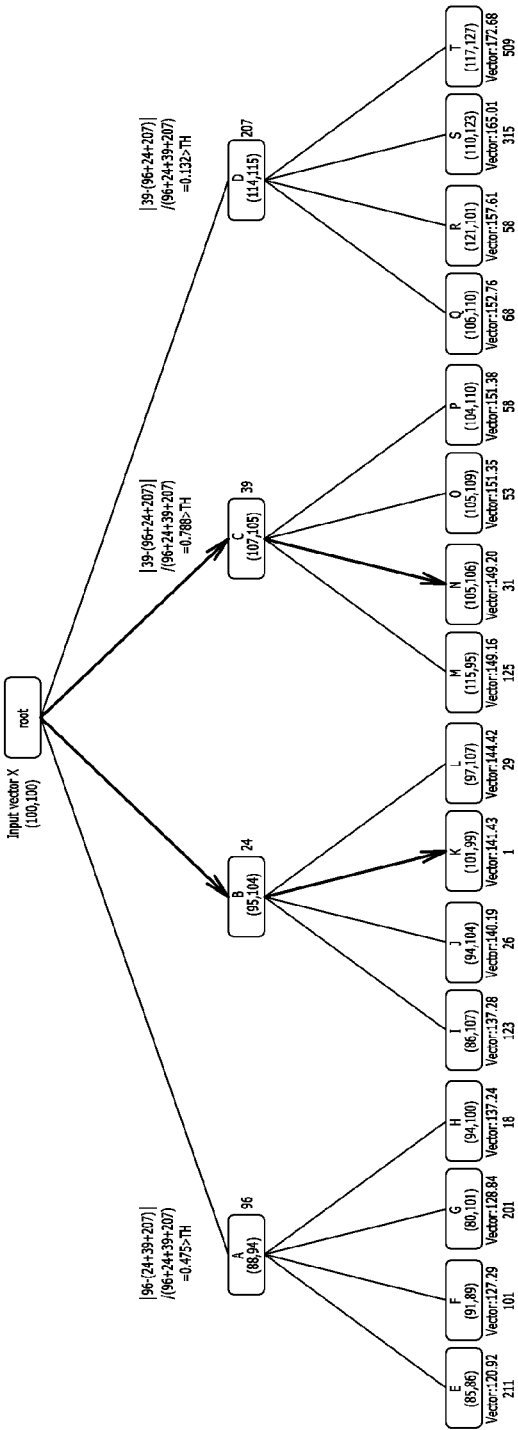
FIG. 3 is a view for explaining dynamic four-path tree structured vector quantization using a tree structured pattern for comparing/calculating one to four branches in accordance with thresholds when codebook data is compared with video data.

For reference, FIG. 3 is a view for explaining a method of dynamic four-path tree structured vector quantization using a tree structured pattern for comparing/calculating one to four branches in accordance with thresholds when codebook data is compared with video data.

As shown therein, the codebook vectors where the magnitudes of vectors (i.e., the square roots of the sums of squared vector components) are arranged in order are placed at the lowermost nodes, and their upper nodes are configured by averaging the vectors of adjacent four nodes.

For example, in FIG. 3, vector values (88, 94) of an 'A' node are obtained by calculating means of vector value (85, 86), (91, 89), (80, 101) and (94, 100) of codebook vectors, i.e., lower nodes 'E', 'F', 'G' and 'H' node.

That is, the vector values '88 and 94' of the 'A' node are configured with (85+91+80+94)/4 and (86+89+101+100)/4, that are obtained by adding x and y components of 'E', 'F', 'G' and 'H' nodes together and dividing the total by the number (i.e., 4) of path.

Likewise, the vector values of 'B' node and 'C' node and 'D' node are also configured as described above.

Meanwhile, differences in between x and y components of an input vector X (100, 100) and x and y vector components in the 'A', 'B', 'C' and 'D' nodes configured as described above are squared and then divided in half to obtain mean square errors, i.e., '96', '24', '39' and '207' as shown in FIG. 3.

Then, a threshold between 0 and 1 is set up (in this embodiment, 0.7 but variable in accordance with conditions), and thresholds between four paths 'A', 'B', 'C', and 'D' in an input vector 'X' are calculated and then compared with the setting threshold.

The input vector 'X' and the thresholds between the four paths 'A', 'B', 'C', and 'D' are calculated by the following [Expression 2], [Expression 3], [Expression 4] and [Expression 5].

$$T(B1)=|mse(B1)-(mse(B2)+mse(B3)+mse(B4))|/(mse(B1)+mse(B2)+mse(B3)+mse(B4)) \quad \text{[Expression 2]}$$

$$T(B2)=|mse(B2)-(mse(B1)+mse(B3)+mse(B4))|/(mse(B1)+mse(B2)+mse(B3)+mse(B4)) \quad \text{[Expression 3]}$$

$$T(B3)=|mse(B3)-(mse(B1)+mse(B2)+mse(B4))|/(mse(B1)+mse(B2)+mse(B3)+mse(B4)) \quad \text{[Expression 4]}$$

$$T(B4)=|mse(B4)-(mse(B1)+mse(B2)+mse(B3))|/(mse(B1)+mse(B2)+mse(B3)+mse(B4)) \quad \text{[Expression 5]}$$

In the Expressions, mse(B1), mse(B2), mse(B3) and mse(B4) respectively refer to a mean square error of the path 1, a mean square error of the path 2, a mean square error of the path 3 and a mean square error of the path 4 at a certain node.

As shown in FIG. 3, the 'B' node having the smallest mean square error among the mean square errors '96', '24', '39' and '207' of the 'A', 'B', 'C', and 'D' nodes is first selected, and the 'C' node path having a threshold greater than the setting threshold (i.e., 0.7) among the thresholds calculated by the Expressions among the others 'A', 'C', and 'D' is then selected.

Meanwhile, the selected B and C nodes respectively have four paths 'I', 'J', 'K' and 'L' and 'M', 'N', 'O', and 'P', and their mean square errors are calculated as described above, thereby selecting the node path having the smallest mean square error.

For example, in FIG. 3, the mean square errors '123', '26', '1' and '29' are calculated with regard to the 'I', 'J', 'K' and 'L' paths of the B node, and the 'K' node having the smallest mean square error is selected.

Also, the mean square errors '125', '31', '53' and '58' are calculated with regard to the M', 'N', 'O', and 'P' paths of the 'C' node, and the 'N' node having the smallest mean square error is selected.

As described above, calculation of four paths is more effective and takes less time than calculation of two paths. In the calculation of four paths, the maximum number of calculation time is 310(=256+64+16+4) if the threshold is 0, and the minimum number of calculation time is 16 if the threshold is 1. Therefore, the four paths and the conventional two paths are the same with regard to the minimum number of calculation time of 16. However, the maximum number of calculation time in four paths is smaller than the maximum number of calculation time of 510 in the conventional two paths.

As described above, in a method for four-path tree structured vector quantization, dynamic four-path tree structured vector quantization is used instead of conventional dynamic two-path tree structured vector quantization, thereby having effects on more efficiently and quickly searching a codebook.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method for four-path tree structured vector quantization, which previously stores various pieces of data in a codebook and compares the stored data with video data to send a receiving terminal only an address that represents a group where the most similar data is collected, the method comprising performing operations on at least one of the various pieces of data in the codebook or the video data, the operations including:

(a) placing codebook vectors where magnitudes of vectors are arranged in order at lowermost nodes;
    (b) configuring upper nodes by averaging vector values of the lowermost adjacent four nodes;
    (c) calculating mean square errors to paths of the upper nodes (A, B, C, and D) corresponding to four paths from an input vector 'X';
    (d) presetting a threshold between 0 and 1 after the '(c)';
    (e) calculating thresholds between the input vector 'X' and four paths 'A', 'B', 'C', and 'D', based on the mean square errors; and
    (f) comparing the thresholds calculated in the '(d)' with the preset threshold to select a path having a threshold greater than the preset threshold, wherein the upper nodes are configured by adding up x components of the plurality of adjacent lower nodes and adding up y components and dividing respective totals by the number of path, wherein the mean square errors are calculated by squaring differences in between x and y components of the input vector 'X' and x and y vector components in the upper nodes (A, B, C and D) and dividing the differences in half, and wherein the thresholds of four paths are calculated based on the mean square errors and compared with the threshold preset in the '(d)', only a path having a high threshold is selected, and the thresholds about the four paths are calculated by the following Expressions:

$$T(B1)=|mse(B1)-(mse(B2)+mse(B3)+mse(B4))|/(mse(B1)+mse(B2)+mse(B3)+mse(B4))$$

$$T(B2)=|mse(B2)-(mse(B1)+mse(B3)+mse(B4))|/(mse(B1)+mse(B2)+mse(B3)+mse(B4))$$

$$T(B3)=|mse(B3)-(mse(B1)+mse(B2)+mse(B4))|/(mse(B1)+mse(B2)+mse(B3)+mse(B4))$$

and $$T(B4)=|mse(B4)-(mse(B1)+mse(B2)+mse(B3))|/(mse(B1)+mse(B2)+mse(B3)+mse(B4)),$$

where, mse(B1), mse(B2), mse(B3), and mse(B4) are a mean square error about the path 1, a mean square error about the path 2, a mean square error about the path 3, and a mean square error about the path 4, respectively.

2. The method according to claim 1, wherein a path having a smallest mean square error is preferentially selected.

* * * * *